(12) United States Patent
Simpson et al.

(10) Patent No.: US 7,945,664 B2
(45) Date of Patent: May 17, 2011

(54) SYSTEM AND METHOD FOR ACCESSING NETWORK SERVICES

(75) Inventors: Shell S. Simpson, Boise, ID (US); Ward S. Foster, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3018 days.

(21) Appl. No.: 09/998,996

(22) Filed: Nov. 15, 2001

(65) Prior Publication Data

US 2003/0093529 A1  May 15, 2003

(51) Int. Cl.
*G06F 15/177* (2006.01)
*G06F 15/173* (2006.01)
(52) U.S. Cl. .............. 709/225; 709/217; 709/226
(58) Field of Classification Search .............. 709/217, 709/225, 226, 228, 229, 243, 203
See application file for complete search history.

(56) References Cited

U.S. PATENT DOCUMENTS

| | | | | |
|---|---|---|---|---|
| 6,012,083 A | * | 1/2000 | Savitzky et al. | 709/202 |
| 6,020,973 A | * | 2/2000 | Levine et al. | 358/1.15 |
| 6,369,909 B1 | * | 4/2002 | Shima | 358/1.15 |
| 6,397,261 B1 | * | 5/2002 | Eldridge et al. | 713/171 |
| 6,453,129 B1 | * | 9/2002 | Simpson et al. | 399/23 |
| 6,496,859 B2 | * | 12/2002 | Roy et al. | 709/223 |
| 6,623,527 B1 | * | 9/2003 | Hamzy | 715/513 |
| 6,735,623 B1 | * | 5/2004 | Prust | 709/219 |
| 6,757,070 B1 | * | 6/2004 | Lin et al. | 358/1.1 |
| 6,789,111 B1 | * | 9/2004 | Brockway et al. | 709/222 |

\* cited by examiner

*Primary Examiner* — Hussein A. Alchanti

(57) ABSTRACT

The present disclosure relates to a system and method for accessing network services. In one arrangement, the system and method pertain to obtaining an address of a network service from a local device via a direct connection, and facilitating designation of the network service address as a default destination such that a user browser can be redirected directly to the network service when an appropriate command is received.

36 Claims, 9 Drawing Sheets

SYSTEM AND METHOD FOR ACCESSING NETWORK SERVICES

FIELD OF THE INVENTION

The present disclosure relates to a system and method for accessing network services. More particularly, the disclosure relates to a web-based imaging system and method with which network services associated with a local device can be accessed and utilized.

BACKGROUND OF THE INVENTION

As computer technology has advanced, the role of computers in our daily lives has expanded, as has the need for various peripheral or supporting devices. One typical peripheral device used with computers is a printer, which generates hard copies of electronic data. The types and capabilities of available printers have similarly been expanding, resulting in a wide variety of printers with a range of printing capabilities, performance, and price.

One significant expansion in the use of computer technology is the networking of computers. Networking computers together allows the computers to communicate with one another as well as with other devices, such as printers. As computer networks, such as the Internet, continue to develop, there is increasing demand for additional and improved functionalities that draw upon and exploit the full computing potential of computer networks.

SUMMARY OF THE INVENTION

The present disclosure relates to a system and method for accessing network services. In one arrangement, the system and method pertain to obtaining an address of a network service from a local device via a direct connection, and facilitating designation of the network service address as a default destination such that a user browser can be redirected directly to the network service when an appropriate command is received.

The present disclosure further relates to an imaging extension stored on a computer-readable medium. In one arrangement, the imaging extension comprises logic configured detect when a client device is directly connected to a local device, logic configured to obtain an address of a network service associated with the local device via the direct connection, and logic configured to designate the network service address as a default destination.

Moreover, the present disclosure relates to a direct connection manager stored on a computer-readable medium. In one arrangement, the manager comprises logic configured detect when a client device is directly connected to a local device, logic configured to obtain an address of a network service associated with the local device via the direct connection, and logic configured to instruct a user personal imaging repository to designate the network service address as a default destination.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for accessing network services. The system can have a distributed architecture with which a user can maintain imaging data. In a such an arrangement, the user may access a network-based or web-based imaging service that enables the user to access the imaging data in the user's personal imaging repository, as well as arrange the imaging data as desired. Once the arrangement has been selected, a document can be stored in the user's personal imaging repository and, if desired, accessed and used by a destination service associated with a local device.

To facilitate description of the inventive system and method, example systems are discussed with reference to the figures. Although these systems are described in detail, it will be appreciated that they are provided for purposes of illustration only and that various modifications are feasible without departing from the inventive concept. After the description of the example systems, examples of operation of the systems are provided to explain the manners in which the network services can be accessed.

Figure 1:
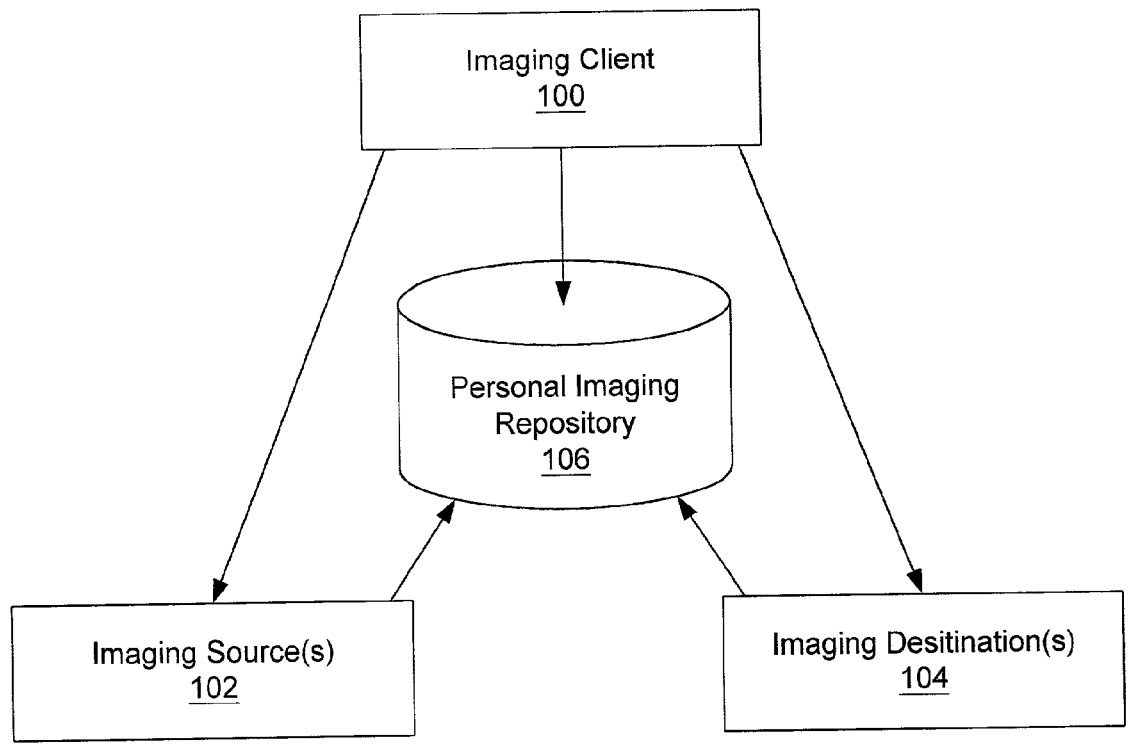
FIG. 1 is a schematic representation of the general operation of the invention.

FIG. 1 is a schematic representation of the general operation of the invention. As shown in this figure, an imaging client 100 communicates with one or more imaging sources 102, one or more imaging destinations 104, and a personal imaging repository 106. The imaging source(s) 102 represent any of a wide variety of devices/services that can be accessed by the imaging client 100 and used to select or identify imaging data to be used to create a document.

The personal imaging repository 106 provides image storage facilities that typically are personalized for the individual imaging client 100. The imaging repository 106 can be located in various different places. For example, the repository 106 can be maintained on one or more computing devices associated with the imaging client 100, imaging source(s) 102, or imaging destination(s) 104. Alternatively, the repository 106 can be maintained on a separate computing device (e.g., server) that the imaging client 100, imaging source(s) 102, and imaging destination(s) 104 can access. The imaging data in the imaging repository 106 can be any type of printable data, such as text, graphics, frames of video or animations, pictures, combinations thereof, and so forth.

Once imaging data are stored in the personal imaging repository 106, the imaging client 100 can select data from the repository that is to be communicated to the imaging destination(s) 104 for some form of processing or manipulation. By way of example, the data are communicated to the image destination(s) 104 for printing. Where the imaging destination(s) 104 are adapted for printing, they may comprise any of a wide variety of printing devices that are capable of generating hard copy documents, such as printers, multifunction peripherals (MFPs), plotters, services managing printing devices, and so on.

As will be apparent from the discussions that follow, the above-described manner of operation provides a high degree of personalization to the imaging client 100. Specifically, in that the client's personal information can be accessed and utilized with any participating service (e.g., web site) used by the client, each service can be customized for the user.

Figure 2:
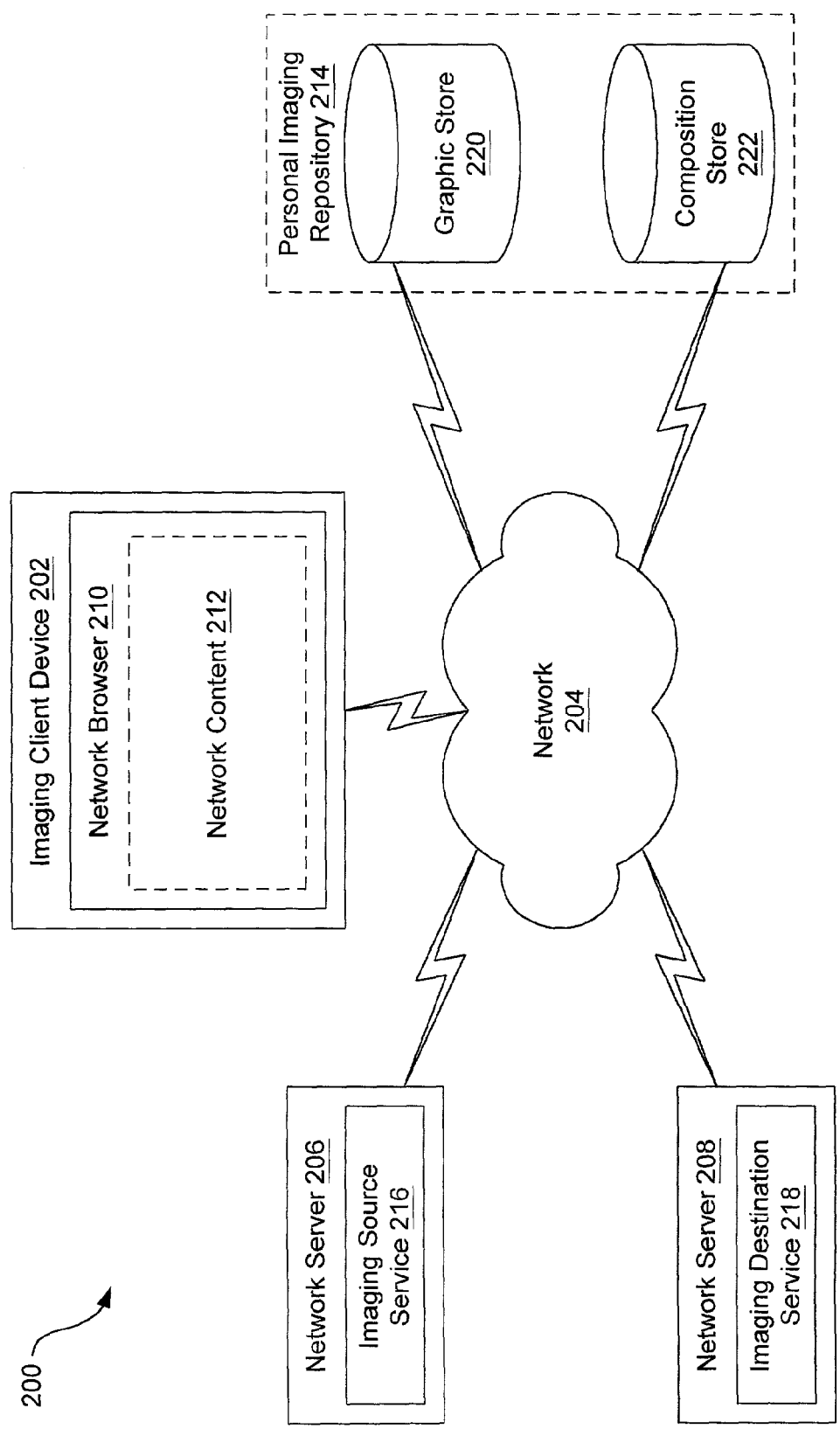
FIG. 2 is an example distributed system in which the invention can be implemented.

FIG. 2 illustrates an example distributed system 200 in which the invention can be implemented. As indicated in FIG. 2, the system 200 includes an imaging client device 202 that is coupled to a network 204. Through this coupling, the imaging client device 202, and therefore the imaging client (i.e., user), can be placed in communication with one or more network servers, such as servers 206 and 208. The client device 202 and network servers 206 and 208 can represent any of a wide variety of conventional wired and/or wireless computing devices, such as desktop computers, portable computers, dedicated server computers, multi-processor computing devices, personal digital assistants (PDAs), mobile telephones, pen-based computers, gaming consoles, and so forth.

The network 204 represents one or more data distribution networks that can be used to communicate data and other information (e.g., control information) between or among various computing devices. Examples for the network 204 include the Internet, a local area network (LAN), a public or private wide area network (WAN), and combinations thereof. The network 204 can further include various different types of networks, including wired and/or wireless portions, employing any of a wide variety of different communications protocols including public and/or proprietary communications protocols.

During operation, the user can operate a network browser 210 executing on the imaging client device 202 to interact with imaging services 216, 218 executing on the network servers 206 and 208. As used herein, the term "services" refers to software and/or firmware components that can execute on one or more computing devices and which provide one or more particular functionalities to the imaging client device 202 such as imaging data selection and arrangement, data manipulation, printing, and so forth. As indicated in FIG. 2, the network browser 210 can receive network content 212 from one or more of the network servers 206 and 208. This content 212 typically includes various components such as, for example, text, graphics, and various commands (e.g., hypertext mark-up language (HTML), Java™, JavaScript™, etc.) and/or applications (e.g., Java™ applets). In use, the content 212 can, in some arrangements, facilitate communication with a personal imaging repository 214 so that the servers 206 and 208 can access data stored in the repository. Examples of the ways in which this communication can be facilitated are described below with reference to FIGS. 3 and 4.

The network server 206 executes an imaging source service 216 that, among other things, allows the user to interact with his or her personal imaging repository 214. The imaging source service 216 may actually provide multiple services that can be accessed. In some embodiments, these different services can provide different functionalities. For instance, one service may be responsible for graphic storage and retrieval while another service may be responsible for merging graphics in a single document. By accessing these services with the network browser 210, the user can select or identify imaging data that are to be stored as graphics in a graphic store 220 of the personal imaging repository 214. These graphics can be stored as individual files and generally can comprise any data capable of being represented as a two dimensional graphic. As is discussed below, the individual graphics in store 220 can be used as individual images that can be printed on appropriate print media, or multiple individual graphics can be compiled together as a single image for printing.

Irrespective of whether multiple graphics are to be used, the imaging source service 216 can be used to arrange the graphic(s) on a visual representation of a document to be created. Once the arrangement has been selected, the imaging source service 216 can store the arrangement as a composition (i.e., a composition image) in a composition store 222 of the personal image repository 214. It is to be noted that, although the graphic store 220 and the composition store 222 are illustrated as two separate stores, multiple such stores may exist in the system 200 and one or more graphic stores may be combined with one or more composition stores. Additionally, one or more of these stores 220 and 222 may be implemented on the imaging client device 202, one or more of the servers 206 or 208, or another designated computing device (not shown).

Once the graphics and composition have been selected, the image data can be processed or otherwise manipulated by accessing an imaging destination service 218 that executes on the network server 208. Where one or more hard copy documents are to be generated, this service 218 can comprise a print service with which the document(s) can be printed. In such a scenario, a print request is communicated to the imaging destination service 218 and, upon receipt of the print request, the network server 208 interacts with the graphic store 220 and composition store 222 to retrieve the data needed to complete the print job. Once these data are retrieved, the network server 208 interacts with one or more printing devices (not shown) to which the server is coupled (directly or indirectly) to generate the hard copy document(s).

Figure 3:
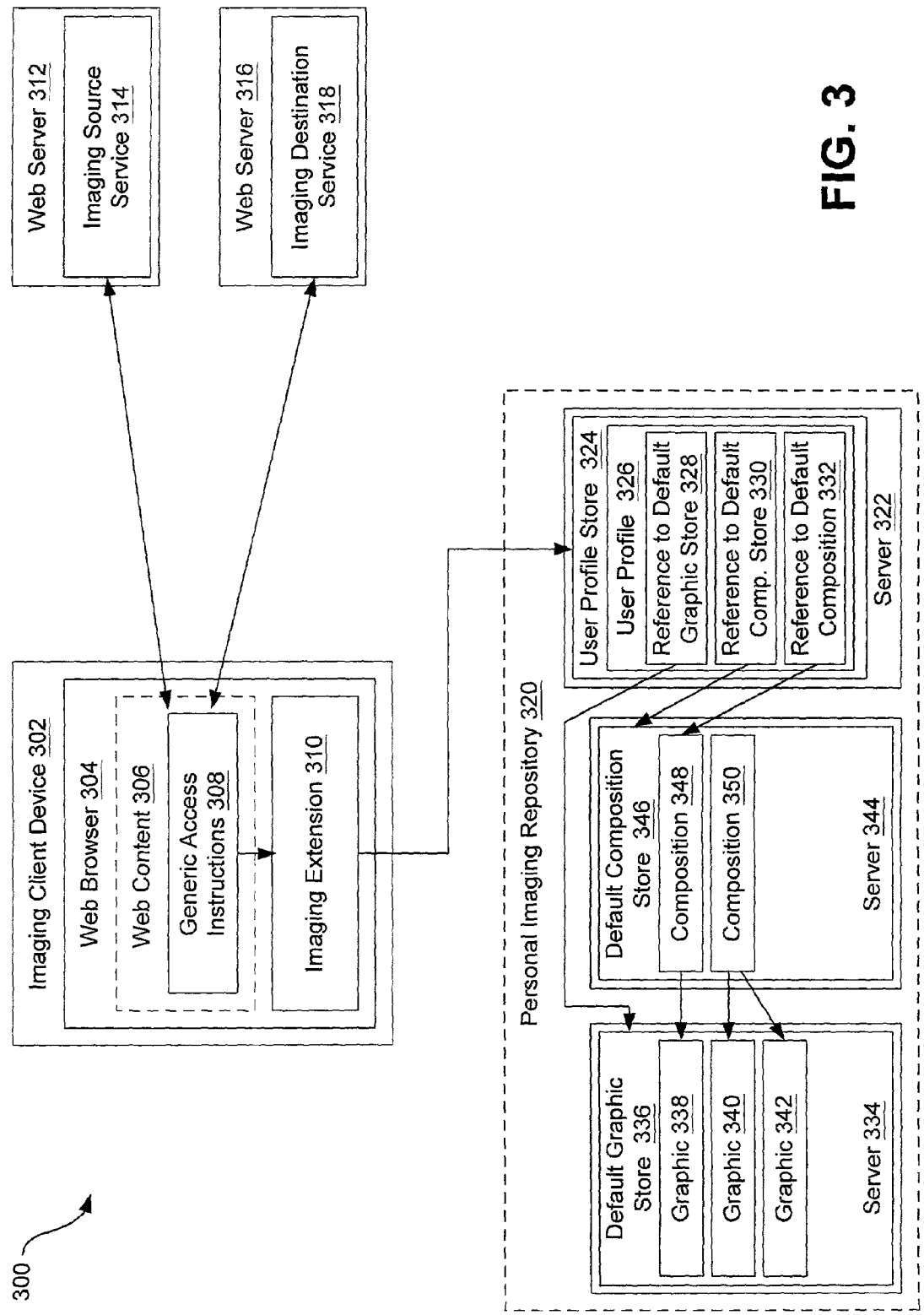
FIG. 3 is a first example web-based imaging system in which the invention can be implemented.

FIG. 3 illustrates a first example web-based imaging system 300 in which the invention can be implemented. As will be appreciated from the discussion that follows, this system 300 can be described as a client-based implementation in that much of the system functionality is provided by a client device. A similar system is described in detail in U.S. patent application Ser. No. 09/924,058, entitled "A Method, System and Program Product for Multiprofile Operations and Expansive Profile Operation," by Shell Simpson, Ward Foster, and Kris Livingston and bearing Attorney Docket No. 10007690-1, the disclosure of which is hereby incorporated by reference into the present disclosure.

As indicated in FIG. 3, the system 300 includes an imaging client device 302. The imaging client device 302 comprises a web browser 304 that is adapted to access web content 306 derived from an imaging source service 314 and an imaging destination service 318 of web servers 312 and 316, respectively. The web content 306, like content 212, typically comprises text, graphics, and various commands. The commands can comprise one or more sets of executable instructions that are downloaded into the browser 304 to perform a service requested by the user. These instructions can be written in any suitable language including, for instance, HTML, Java™, JavaScript™, C-sharp, or other appropriate language. A variety of different functionalities can be served by the executable instructions. For example, the web content 306 normally includes executable instructions for causing target graphics, i.e. graphics provided by an accessed web site, to be displayed to the user.

In the embodiment shown in FIG. 3, the executable instructions are further used to access a personal imaging repository 320. These instructions typically comprise system-wide generic access instructions 308 that call on methods of an imaging extension 310 to access the personal imaging repository 320 and perform various web imaging operations. These instructions 308 are designated as "generic" because they are independent of the configuration of the user's personal imaging repository 320. As is discussed in greater detail below, the generic access instructions 308 can be used to, for example, add a graphic to a default graphic store 336 of the personal imaging repository 320, or add a new composition to a default composition store 346 of the repository.

As is further indicated in FIG. 3, the imaging extension 310 can form part of the browser 304. Although this arrangement is shown in the figure and described herein, the imaging extension 310 can, alternatively, be provided outside of the browser 304, for instance on a different device. Irrespective of its location, however, the imaging extension 310 is configured to respond to the execution of the generic access instructions 308 by generating/mapping to corresponding imaging client specific commands of the user. The imaging extension 310 typically is implemented as one or more application programming instructions (APIs) that, preferably, act as interfaces in accordance with a system-wide standard.

When executed, the generic access instructions 308 cause imaging extension calls (e.g., API calls) to be issued which, in turn, cause the imaging extension 310 (e.g., APIs) to access to the user's personal imaging repository 320. The web content 306 therefore uses the imaging extension 310 as a gateway to access the user's personal imaging repository 320. Generally speaking, the APIs can comprise sets of methods for establishing a destination for redirecting the browser 304 based on some form of received redirection initiation. In such circumstances, the process normally comprises receiving a redirection initiation to redirect the browser 304, retrieving a direct or indirect reference to a destination, and then causing the browser to browse to that destination. It will be recognized that there are many other ways (both in hardware and software) to implement this same functionality.

In some arrangements, the imaging extension 310 is configured to prevent the web content 306 (i.e., the executable instructions from one or more web services), from arbitrarily accessing the user's personal imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal imaging repository 320, the web content 306 must first obtain references using the imaging extension API.

The imaging extension 310 can be used to access one or more user profiles 326 that is/are stored in a user profile store 324 of a server 322 of the personal imaging repository 320. By way of example, the imaging extension 310 can be directed to the user profile 326 with a uniform resource locator (URL), pointer, socket, or other backroom detail. In addition, the imaging extension 310 can be configured to detect when the client device 302 is directly "connected" with a local device. For instance, the imaging extension 310 may be configured to detect when wireless communications (e.g., via radio frequency (RF) or infrared (IR) transmissions)) have been established between the client device 302 and a local device. In such a case, the imaging extension 310 can further be configured to note the address of a network service associated with the local device so as to facilitate access to the service.

The user profile 326 typically includes references to all or a portion of the personal imaging repository 320 for that user profile. For instance, as shown in FIG. 3, the user profile 326 can include a reference 328 to a default graphic store, a reference 330 to a default composition store, and a reference 332 to a default composition. In addition, the user profile 326 can contain other information particular to the user such as the location (i.e., address) of a preferred imaging destination (e.g., an imaging home page) that the user may wish to access by default (e.g., when a "print" command is selected). In addition, the user profile can contain the location (i.e., address) of a temporary imaging destination that is used to temporarily override the preferred imaging destination, where appropriate. For instance, where the user wishes to print to a local printing device that is web-enabled, the user may wish to designate the address (e.g., URL) of a printing service associated with the printing device to more directly access the service. In use, the user profile 326 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default graphic store 336 and the default composition store 346.

Like the user profile store 324, the default graphic store 336 and default composition store 346 can reside on separate servers 334 and 344. It will be understood, however, that one or more of the stores could reside on a single machine, if desired. As indicated in FIG. 3, the default graphic store 336 is used to store various graphics, such as graphics 338, 340 and 342. These graphics can be stored in substantially any format. For example, these formats can comprise PDF, JPEG, PostScript, TIFF, GIF, BMP, etc. In addition, the default graphic store 336 can include one or more APIs. Therefore, in contrast to merely providing for graphic storage, the graphic store 336 can also provide services used to create, retrieve, and/or manipulate graphics. Furthermore, the default graphic store 336 can communicate with the web content of various web services. For example, the imaging destination service 318 can submit queries to the default graphic store 336 (via the extension 310) to request that one or more graphics be transmitted to the service in a desired arrangement.

The default composition store 346 stores various compositions, such as compositions 348 and 350, which can be used to arrange the selected graphics. Like the user profile store 324 and default graphic store 336, the default composition store 346 can also comprise various APIs that can access graphics from the graphic store, manipulate the graphics, etc.

Figure 4:
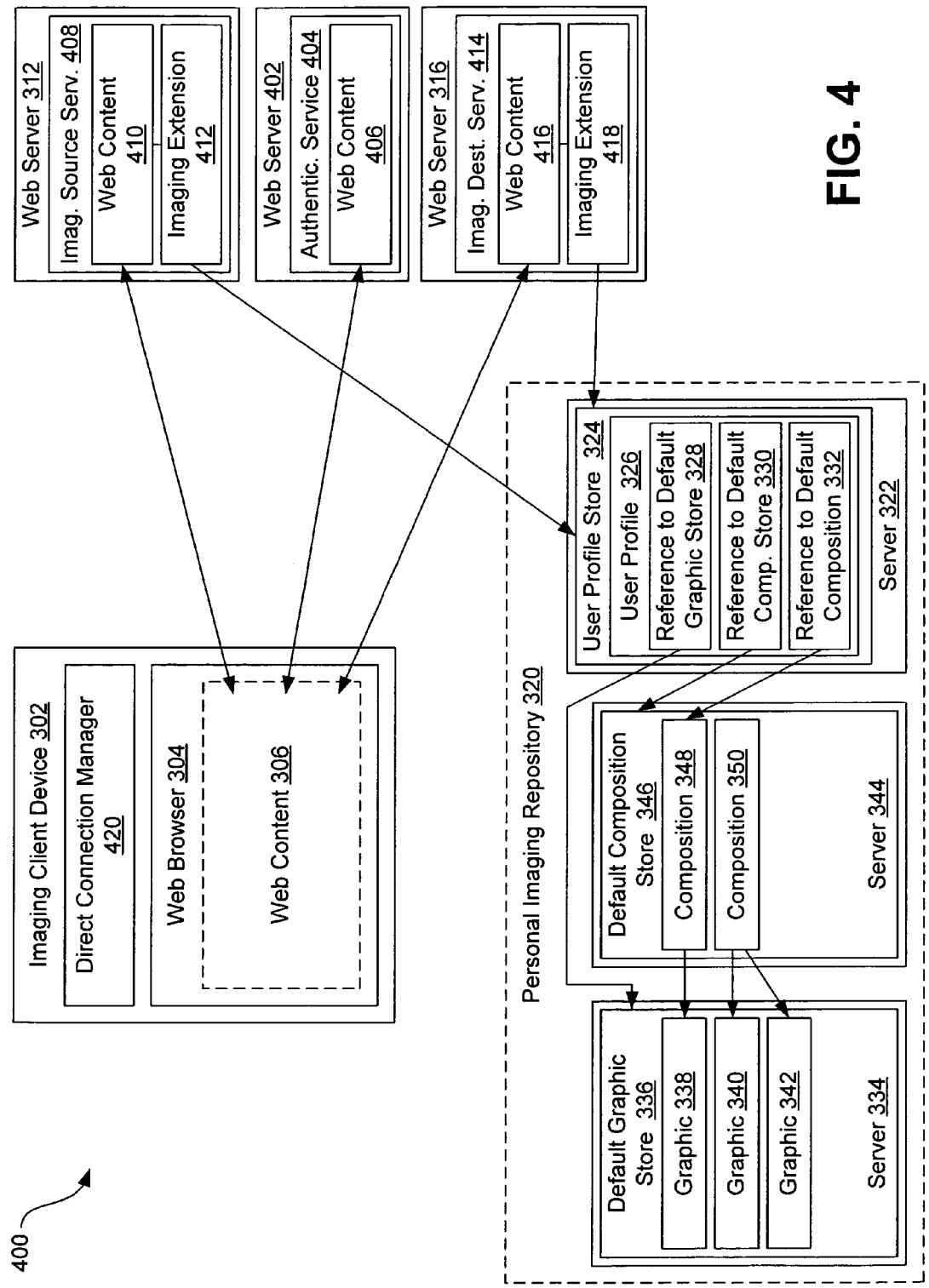
FIG. 4 is a second example web-based imaging system in which the invention can be implemented.

FIG. 4 illustrates a second example web-based imaging system 400 in which the invention can be implemented. As indicated in FIG. 4, the system 400 includes many of the features of the system 300 shown in FIG. 3. Therefore, the system 400 includes an imaging client device 302 that executes a web browser 304 to receive web content 306. The system 400 also includes a personal imaging repository 320 that can, for instance, comprise a user profile store 324, a default graphic store 336, and a default composition store 346. Furthermore, the system 400 includes web servers 312 and 316. Each of these components is generally configured in similar manner as the like-named and numbered features identified in FIG. 3. However, unlike the client-based system 300, the system 400 provides a server-based implementation in which much of the functionality provided by the client device 302 in the system 300 is transferred to another device. By way of example, this other device can comprise a further web server 402, which executes an authentication service 404. As shown in FIG. 4, the authentication service 404 comprises web content 406 (e.g., generated on the fly) that can be downloaded into the user's browser 304.

In addition to the above-noted differences, the servers 312 and 316 are provided with different software in the system 400 to permit alternative modes of operation. By way of example, the web server 312 can execute an imaging source service 408, which includes web content 410 and an imaging extension 412. Similarly, the web server 316 can execute an imaging destination service 414 that includes web content 416 and an imaging extension 418. Like the web content of the system 300, the web content 410 and web content 416 typically comprise text and graphics that can be downloaded into the user's browser 304. Unlike the system 300, however, generic access instructions need not be downloaded into the browser 304 in that the browser does not comprise its own imaging extension. Such an arrangement is advantageous where the client device 302 has limited storage capacity (e.g., for PDAs, mobile telephones). Instead, as identified above, the services 408 and 414 include their own imaging extensions 412 and 418 that can be used to access the user's personal imaging repository 320. By way of example, the content 410 and 416 comprise server-side code including one or more of PHP script, Java™ Servlets, Java™ server pages (JSPs), active server pages (ASPs), etc.

Each of the imaging extensions 412 and 418 typically has a configuration that is similar to that of the imaging extension 310. Therefore, the imaging extensions 412 and 418 can comprise one or more APIs that, when executed, access to the user's personal imaging repository 320. Again, the APIs can comprise sets of methods for establishing a destination for redirecting the browser 304 based on some form of received redirection initiation. The APIs can implement, for instance, a URL, pointer, socket, or other backroom detail to facilitate the redirection.

The manner in which the personal imaging repository 320 is accessed by the services in the system 400 will now be discussed with reference to an example scenario. In this example, the user browses to the imaging source service 408 using the web browser 304 of the client device 302. Upon reaching the service 408, web content 410 is executed to generate web pages that are downloaded to the web browser 304 (as content 306). Once this occurs, the browser 304 is redirected by the content 306 to the authentication service 404 that resides on the web server 402. Typically, this is accomplished by the web content 410 by generating a hypertext transfer protocol (HTTP) redirect that, when downloaded to the browser 304, causes the browser to redirect to an address (e.g., URL) identified in the header entry. Web content is then downloaded to the web browser 304 and the user is provided with an opportunity to complete an authentication procedure that identifies both the user's identity and the location of the user's personal imaging repository 320. The authentication procedure can, for example, comprise entry of authentication information, such a user name and password, that has been registered with the authentication service 404, for example, in a previous session. This information can be entered in a web page generated by the server 402. In an alternative arrangement, the authentication procedure can comprise the reading of a user identification card, which includes storage media (e.g., magnetic strip) that contains the user's authentication information. Persons having ordinary skill in the art will recognize that many other authentication alternatives exist.

Once the authentication procedure is successfully completed by the user, the browser 304 is again redirected, this time back to the imaging source service 408. The redirection address (e.g., URL) used to revisit the imaging source service 408 contains information that identifies the user and information identifying the user's personal imaging repository 320 (e.g., with a further URL). To avoid continual redirection back and forth, a "cookie" can be stored on the client device 302 that permits the authentication service 404 to validate the user's identity without requiring a further log in. Once this information is possessed by the imaging source service 408, the service can, when appropriate, make calls to its imaging extension 412 (e.g., API calls) to command the imaging extension to access the user profile store 324 of the personal imaging repository 320. Through this access, the imaging source service 408 can be used by the user to, for instance, select or identify imaging data to be stored as graphics in the default graphic store 336.

When the imaging destination service 414 is accessed, for example through redirection from the imaging source service 408, various content is downloaded to the web browser 306. The imaging destination service 414 can then access the default graphic store 336 and default composition store 346 such that the graphics to be printed can be accessed and their arrangement on the document obtained.

As noted above, the imaging client device 302 does not include an imaging extension in the embodiment of FIG. 4. The device 302 can, however, include a direct connection manager 420 that is configured to detect when a direct connection has been established with a local device. For instance, the direct connection manager 420 can determine that the client device 302 is directly connected to a local web-enabled printing device. In such a case, the direct connection manager 420 can further be configured to provide the address (e.g., URL) of a network service associated with the local device to the personal imaging repository 320 (i.e., user profile 326) to permit the user to more directly access the service.

Figure 5:
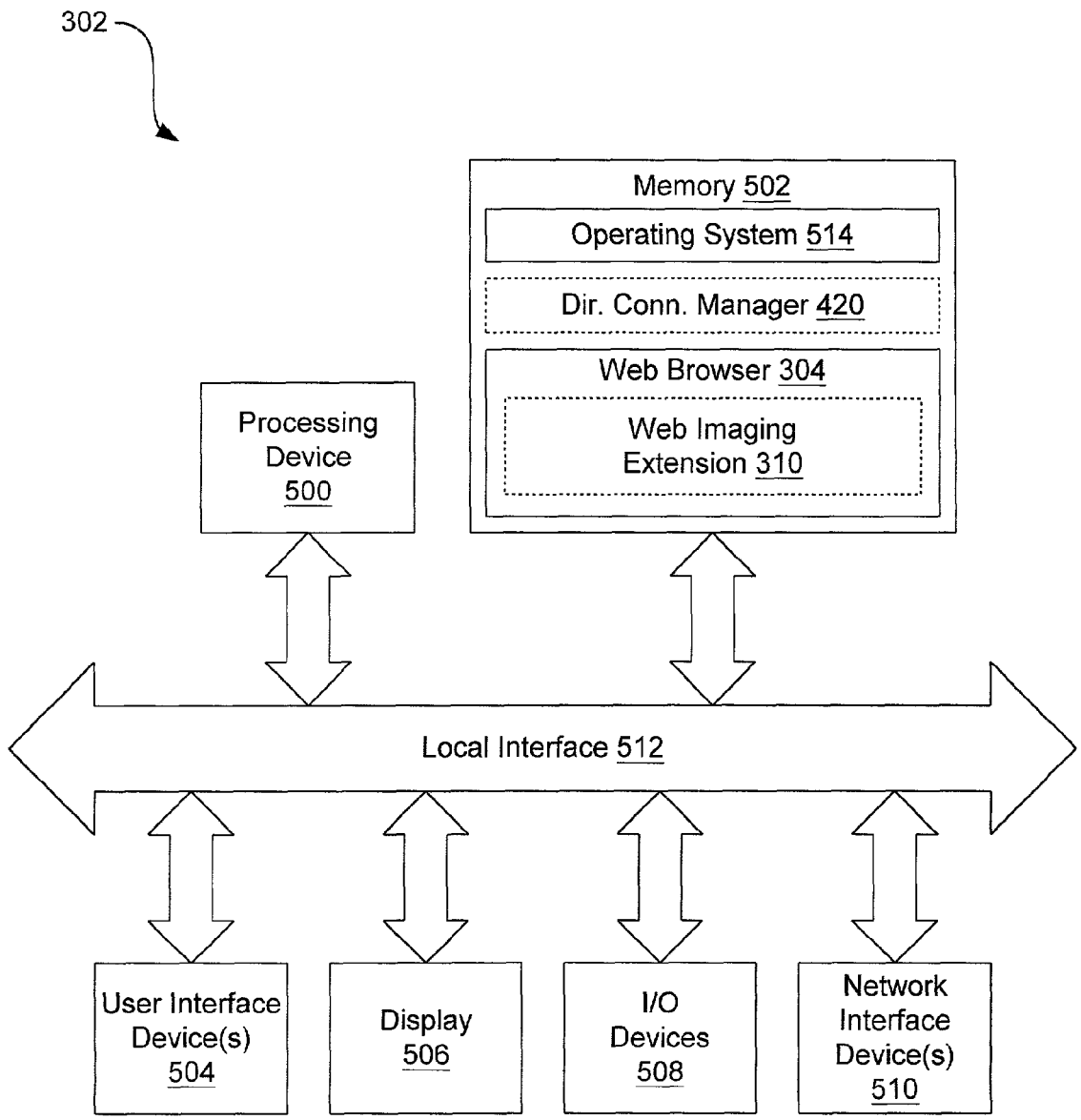
FIG. 5 is a schematic of an example of the imaging client device shown in FIGS. 3 and 4.

FIG. 5 is a schematic view illustrating an example architecture for the imaging client device 302 identified in FIGS. 3 and 4. As identified above, the client device 302 can be any one of a wide variety of conventional wired and/or wireless computing devices, such as desktop computers, portable computers, dedicated server computers, multi-processor computing devices, cellular telephones, PDAs, handheld or pen-based computers, gaming consoles, and so forth. Irrespective its type, the client device 302 typically comprises a processing device 500, memory 502, one or more user interface devices 504, a display 506, one or more input/output (I/O) devices 508, and one or more networking devices 510, each of which is connected to a local interface 512.

The processing device 500 can include any custom made or commercially available processor, a central processing unit (CPU) or an auxiliary processor among several processors associated with the client device 302, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the client device 302. The memory 502 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 504 comprise those components with which the user can interact with the client device 302. For example, where the client device 302 comprises a personal computer (PC), these components can comprise a keyboard and mouse. Where the client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid crystal display (LCD) for a handheld device.

With further reference to FIG. 5, the one or more I/O devices 508 are adapted to facilitate direct connection of the client device 302 to another device (e.g., a local printing device) and may therefore include one or more serial, parallel, small computer system interface (SCSI), universal serial bus (USB), IEEE 1394 (e.g., Firewire™), and/or personal area network (PAN) components. The network interface devices 510 comprise the various components used to transmit and/or receive data over a network (e.g., network 204 in FIG. 2). By way of example, the network interface devices 510 include a device that can communicate both inputs and outputs, for instance, a modulator/demodulator (e.g., modem), wireless (e.g., radio frequency (RF)) transceiver, a telephonic interface, a bridge, a router, network card, etc. As will be appreciated by persons having ordinary skill in the art, the network interface devices 510 can, like the I/O devices 508, be used to facilitate direct connection of the client device 302 to another device (e.g., a local printing device).

The memory 502 normally at least comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources. Where the web browser 304 is configured as indicated in FIG. 3, the browser can comprise an imaging extension 310. However, it will be understood that where the system is arranged as indicated in FIG. 4, the imaging extension 310 need not be provided in the browser 304. As is further identified in FIG. 5, the client device 302 can, optionally, include a direct connection manager 420 that, as described above in relation to FIG. 4, is capable of detecting when the client device is directly connected to another device (e.g., a local printing device) and sharing this information with the personal imaging repository 320. The manager 420, where provided, can comprise an independent software and/or firmware module designed for this purpose or can comprise part of other software and/or firmware that are used to facilitate communications with the other device.

The architecture of the various servers shown in FIGS. 3 and 4 are typically similar to that described above with reference to FIG. 5. Therefore, separate figures are not provided for these servers. Regardless, however, persons having ordinary skill in the art will recognize the various different architectures that could be used for the construction of the servers.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 6:
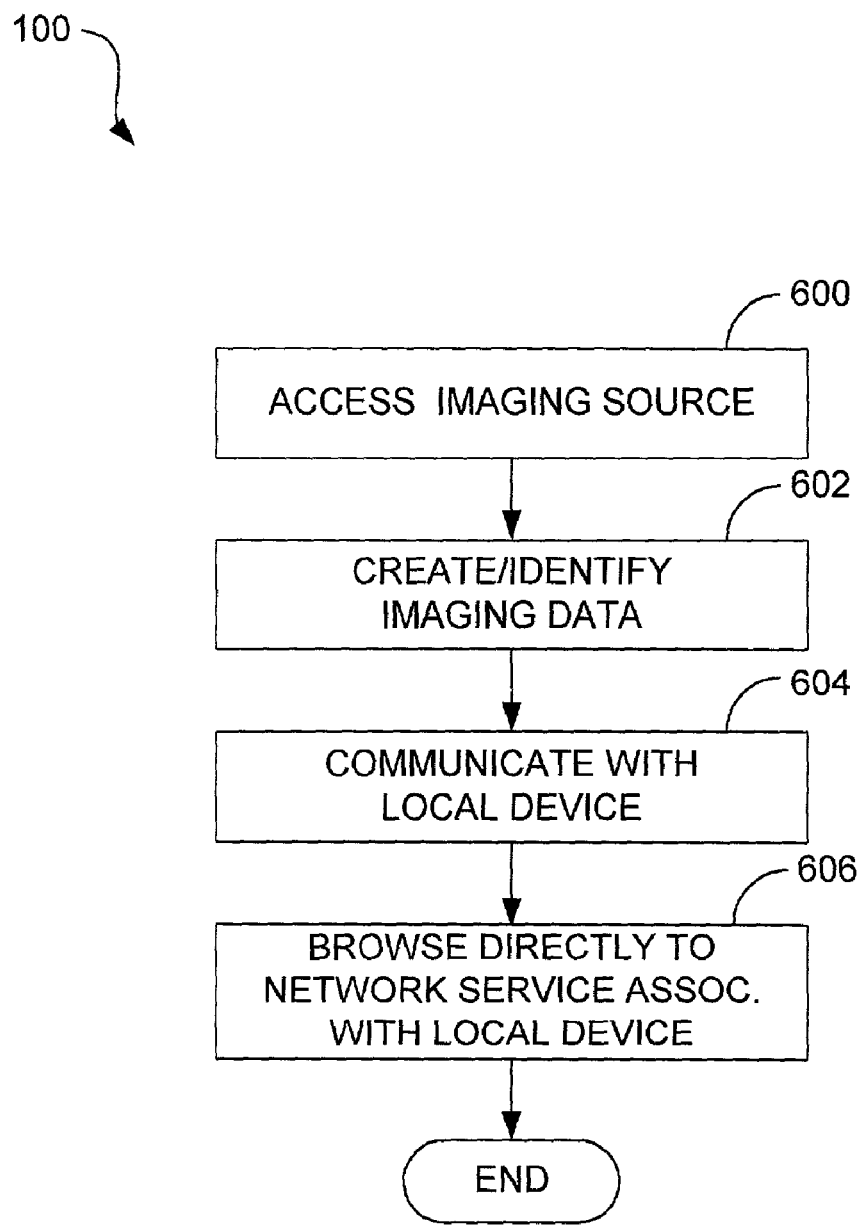
FIG. 6 is a flow diagram that provides an overview of the manner in which the inventive system can be used to access network services.

FIG. 6 provides an overview of the manner in which the inventive system can be used to facilitate obtaining access to network services. More specifically, illustrated is an example of the manner in which the inventive system can be used to more directly access the network services of a local device. As indicated in block 600, an imaging source 102 is first accessed by the user. Once the source is accessed, the user creates or identifies data that are to be used to generate one or more hard copy documents, as indicated in block 602. By way example, data can be created/identified with a suitable user application, such as a word processing application. Where the data are created by the user, the user may further select the arrangement (i.e., composition) of the data. Notably, the data may include text as well as one or more graphics (i.e., non-textual two dimensional renditions).

Figure 7:
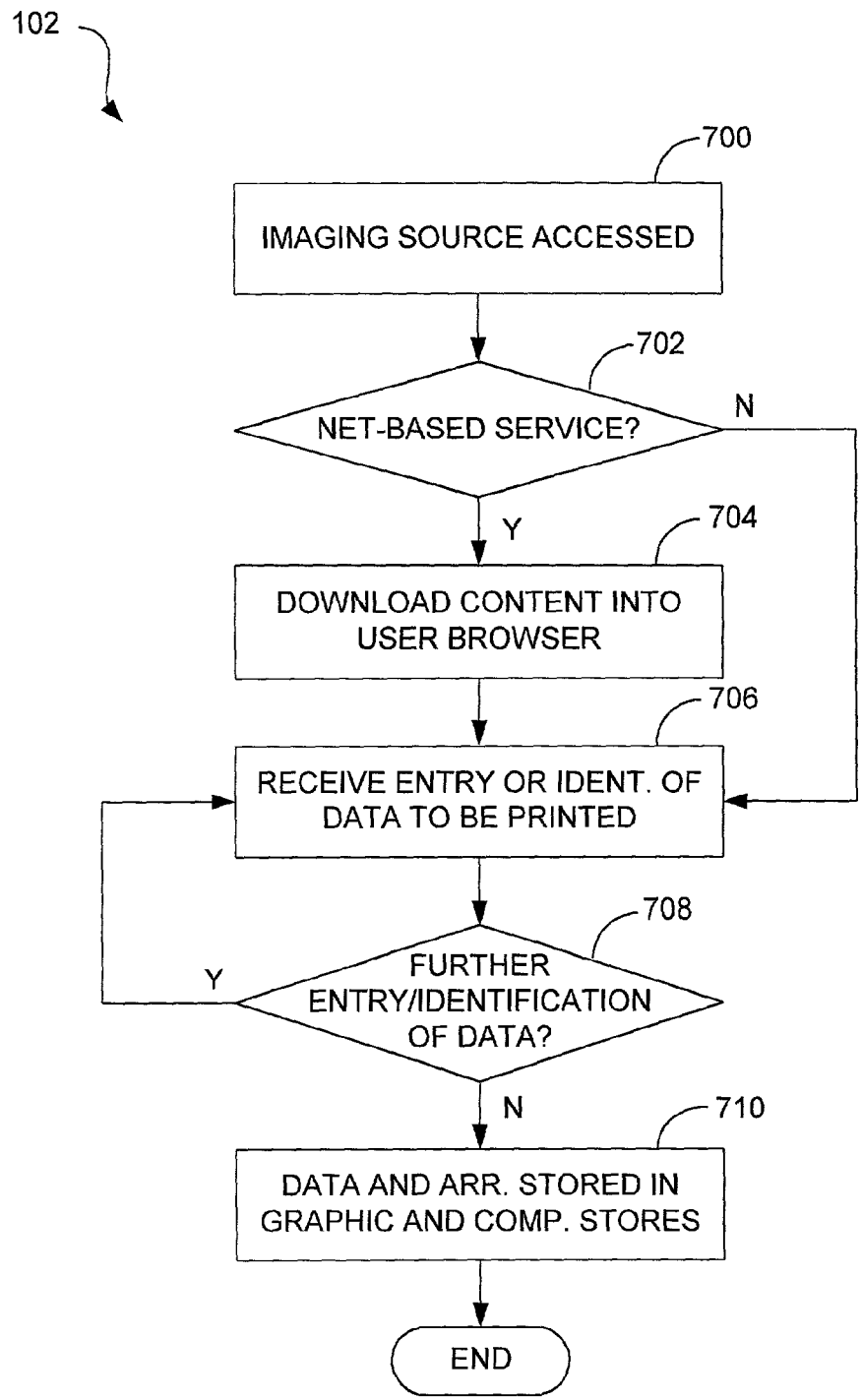
FIG. 7 is a flow diagram of an example of using an imaging source to create and/or identify imaging data.

At this point, or earlier in the flow, the client device 302 can communicate with the local device, as indicated in block 604. Through this communication, the address (e.g., URL) of a network service associated with the device, e.g., hosted by the device, can be obtained. It is noted that the address may be provided in any of a wide range of protocols, including common protocols such as hypertext transfer protocol (HTTP) that operate over TCP/IP networks (i.e., Internet networks) as well as other protocols such as OBEX and those yet to be invented. Examples of the manner in which this information is obtained are described below. By way of example, the service comprises a web site that is served by an embedded server of the local device. Once the address of the network service has been obtained, the user can browse directly to the service using the client device 302, as indicated in block 606. Referring now to FIG. 7, an example of use of an imaging source 102 to create and/or identify data is provided. The imaging source 102 can have various different arrangements. By way of example, the imaging source 102 can simply comprise a local application (e.g., word processing application) that executes on the client device 302. In another example, the imaging source 102 can comprise a network-based (e.g., web-based) service with which data can be created, identified, and/or arranged by the user. Where the imaging source 102 comprises a network-based service, the user may access the source with a browser 304. In such a scenario, the service typically comprises a web site that is accessed via the Internet.

Irrespective of its configuration, the imaging source 102 is first accessed by the user, as indicated in block 700. The operation from this point forward may, however, depend upon whether the imaging source 102 is a local application or a network-based service. Referring to block 702, if the imaging source 102 is not a network-based service, flow continues down to block 706 described below. If, on the other hand, the imaging source 102 is a network-based service, flow continues to block 704 at which the imaging source 102 downloads content 306 into the user browser. As noted above, this content 306 normally includes various text and/or graphics that are displayed to the user to facilitate interfacing between the user and the service. As described above with reference to FIG. 3, this content 306 can, optionally, include generic access instructions 308 that call on methods of an imaging extension 310 of the browser 304 to perform various web imaging operations.

After the imaging source 102 has been accessed, the source can receive entry or identification of data (i.e., graphics), as indicated in block 706. For example, the imaging source 102 can receive data manually entered by the user via the user interface devices 504 of the client device 302. Alternatively, the user can identify the location of data (e.g., a formerly created document) that resides in memory 502 of the client device 302 or in a network-accessible location remote from the device memory. Once the data have been received and/or identified, it can be determined whether further data are to be entered and/or identified, as indicated in decision element 708. If further data are to be entered and/or identified, flow returns to 706 at which these data are received. If no further data are to be entered and/or identified, however, flow continues on to block 710 at which the received data, as well as the arrangement (i.e., composition) of the data, are stored within the personal imaging repository 320. More specifically, the data can be stored within the graphic store 336 and the arrangement of the data can be stored within the composition store 346. Although the data and arrangement (i.e., imaging data) have been described as being stored in separate "stores," persons having ordinary skill in the art will appreciate that the data and their arrangement could be stored within a single "store."

Where the imaging source 102 is a network-based service, storage of the imaging data can be facilitated through use of the imaging extension 310 stored in the user browser 304 and/or an imaging extension 412 stored on web server 408. In the former case, the content 306 downloaded to the browser 304 makes a call (e.g., API call) to the imaging extension 310 to, in turn, cause a call to be made to the user profile store 324 that contains the user profile 326. Through this call, the default graphic store 336 can be accessed and various graphics can be stored therein.

In the example system 400 of FIG. 4, storage of the imaging data is accomplished through use of the imaging extension 412. In particular, when the imaging source 102 was first accessed, the user's browser 304 can have been redirected by the content 306 downloaded into the browser to an authentication service and the user provided with an opportunity to complete an authentication procedure that identifies both the user's identity and the location of the user's personal imaging repository 320. Once the authentication procedure has been successfully completed, the browser 304 is again redirected and the user information, or at minimum the location of the user profile 326, is supplied to the destination (e.g., printing) service. With this information, the service can then access the user's personal imaging repository 320 by making a call to the imaging extension 412 to command the imaging extension to make a call to the user profile store 324 of the personal imaging repository 320. Although use of an imaging extension is specifically identified, persons having ordinary skill in the art will appreciate that, alternatively, the service can directly call the user profile store 324. In such a case, the service can, for instance, use a collection of stubs that are configured to call various elements of the personal imaging repository 320.

It is to be noted that the graphic store 336 and/or composition store 346 can, in some arrangements, form part of or be supported by the imaging source 102. Accordingly, where the imaging source 102 comprises a local application, the stores 336, 346 may be located within memory 502 of the client device 302. Where the imaging source 102 comprises a network-based service, the stores 336, 346 may be located on one or more servers that are accessible over the network 204.

Figure 8:
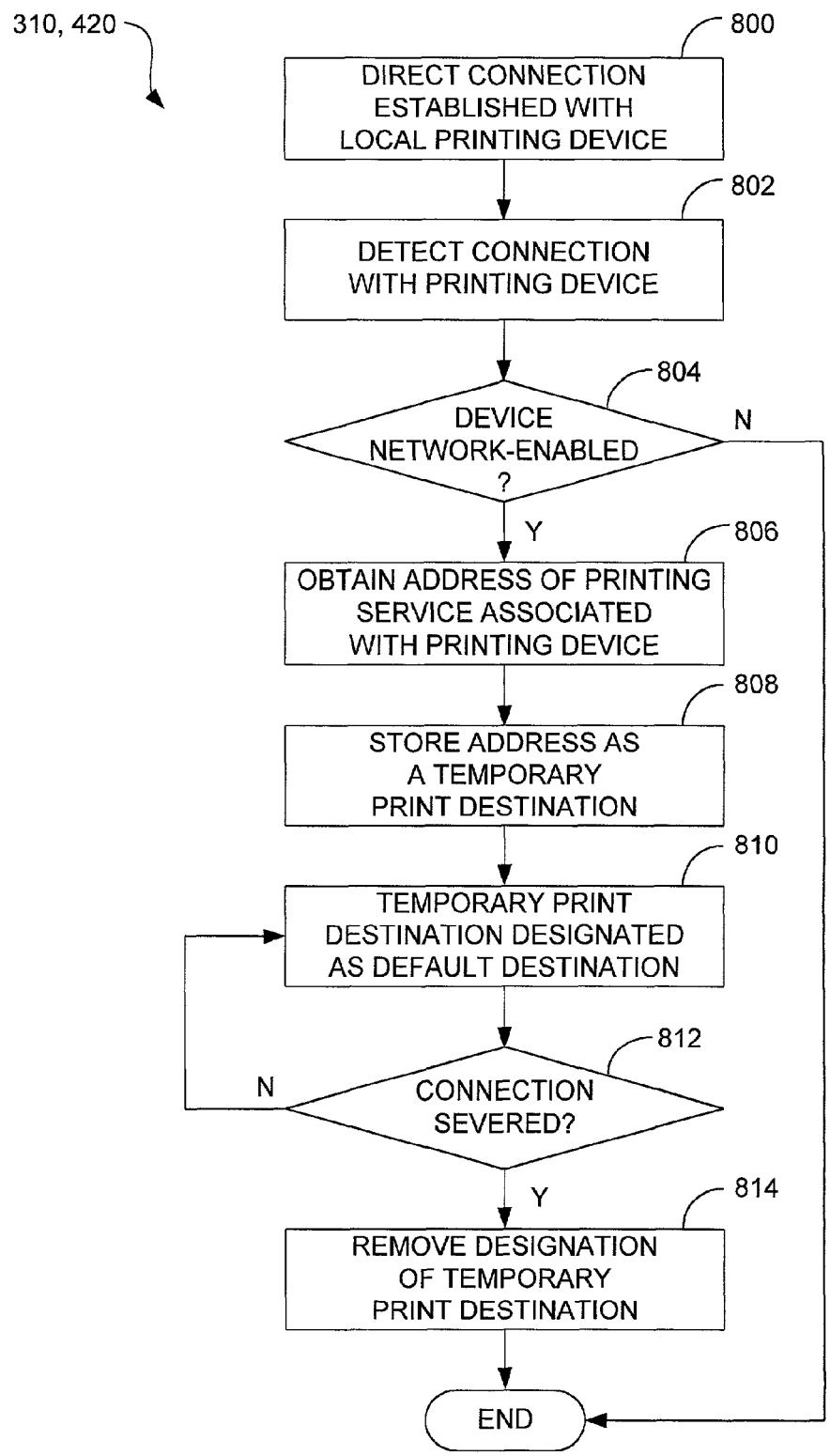
FIG. 8 is a flow diagram of an example of accessing a network service associated with a local device.

FIG. 8 provides an example of the manner in which network services associated with the local device can be accessed. For this example, the services are assumed to be printing services and the local device is assumed to be a printing device. Typically, access to printing services is obtained by first browsing to the preferred printing destination, which may be a web-based imaging home page that is used as a portal to reach the desired printing service. Therefore, once accessed, the imaging home page can be used to ultimately locate the printing service associated with the printing device the user wishes to use. In situations in which the printing service that the user wishes to use is associated with a proximate printing device, however, the printing service associated with the proximate printing device can be accessed more directly, and therefore more quickly, by browsing directly to that service. An example of such direct access is provided in FIG. 8.

Beginning with block 800, direct connection between the client device 302 and the local printing device is established. This connection can be facilitated by wire (e.g., through a USB cable) or wirelessly (e.g., through RF or IR transmission). In addition, the connection can have been established in various different ways. For instance, the connection can have been established due to an initial communication transmitted from the client device 302 to the printing device in response to a user command or automatically as a consequence of the proximity between the client device and the printing device. In another scenario, the connection can have been established by an initial communication sent by the printing device. For example, the printing device can be configured to issue periodic communications (e.g., pings) to determine if client devices capable of communicating back are within range.

In any case, the connection can then be detected, as indicated in block 802. Which component detects this connection may, however, depend upon the configuration of the underlying system. For example, where the system is configured as that shown in FIG. 3, the connection may be detected by the imaging extension 310 stored on the client device 302. Alternatively, where the system is configured as that shown in FIG. 4, the connection may be detected by the direct connection manager 420 described above. Irrespective of which component detects the connection, flow continues to decision element 804 at which it is determined whether the printing device is network-enabled, i.e., whether its printing services can be accessed with a browser. If not, the printing service must be accessed in a more conventional manner and flow is terminated. If the device is network-enabled, however, flow continues to block 806 at which the address (e.g., URL) of the printing service is obtained by the imaging extension 310 or the direct connection manager 420. This service may be hosted by the local printing device. Notably, however, this address may be that of a remote service responsible for representing the local printing device. By way of example, this information can be obtained by querying the printing device. Alternatively, where the printing device is configured for such operation, the printing device can have automatically provided this information in one of the communications it previously sent to the client device 302.

At this point, the address can be stored as a current temporary print destination, as indicated in block 808, and the temporary print destination designated as the current default destination as indicated in block 810. The nature of these steps may again depend upon the configuration of the system. For example, where the system is configured as indicated in FIG. 3, the imaging extension 310 can maintain an internal record of the current default destination such that, when called upon by the generic access instructions 308 that are downloaded into the browser 304, the user's browser 304 will be redirected directly to the print service of the local print device when a "print" command is selected. Where the system is configured as indicated in FIG. 4, the direct connection manager 420 can have communicated with the personal imaging repository 320, e.g., the user profile 326, to instruct it that the current default destination is the print service of the local printing device and provide its address, in effect overriding the preferred printing destination stored within the repository.

With reference to decision element 812, the default destination will continue to be the temporary print destination (i.e., the print service of the local printing device) until such time when the direct connection between the client device 302 and the local printing device is severed. At that time, flow continues to block 814 at which the designation of the temporary print destination as the default destination is removed. Normally, the removal of the designation entails the reverse of the procedure used in block 810. Accordingly, where the system is configured as shown in FIG. 3, the imaging extension 310 will note that the temporary print destination no longer is to be used as the default and, where the system is configured as shown in FIG. 4, the direct connection manager 420 will communicate the same to the personal imaging repository 320.

Figure 9:
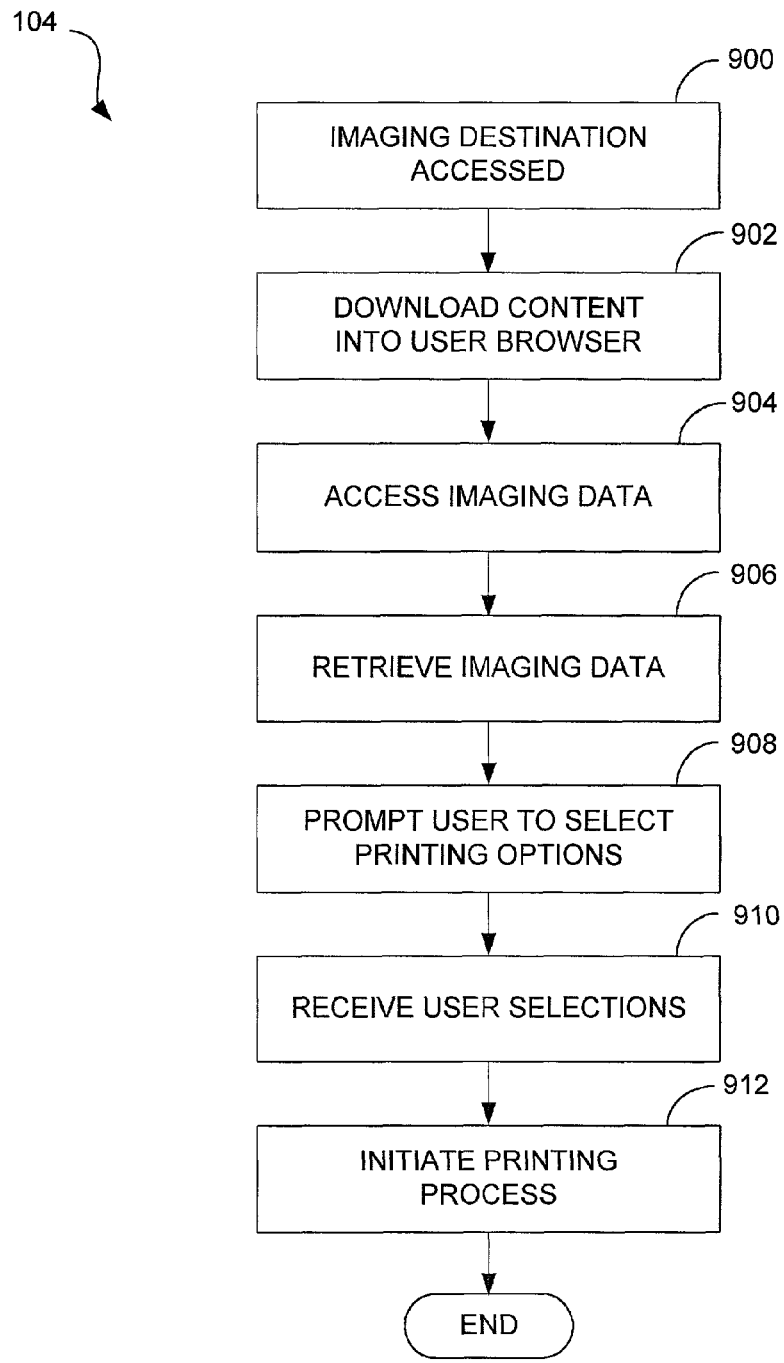
FIG. 9 is a flow diagram of an example of use of the network services of the local device.

With the process described in relation to FIG. 8, the user will be able to directly access the printing service of the local printing device. FIG. 9 describes an example of operation from this point on. Beginning with block 900 of FIG. 9A, the imaging destination 104 (i.e., printing service) is first accessed. By way of example, the process can have been initiated by selecting "print" from a network-based imaging service. With the entry of this command, the printing service can be accessed by way of the imaging extension 310, which now has the address of the printing service (FIG. 3), or the imaging extension 412, which can obtain the address of the printing service from the personal imaging repository 320 (FIG. 4). Once the printing service is accessed, it downloads content 306 into the user's browser 304, as indicated in block 902. This content 306 normally includes various text and/or graphics that are displayed to the user to facilitate interfacing between the user and the service. Where the system is arranged as shown in FIG. 3, the content 306 can also include generic access instructions 308 that call on methods of the imaging extension 310 of the browser 304 so that the user's personal imaging repository 320 can be accessed. Where the system is arranged as shown in FIG. 4, the imaging extension 418 of the imaging destination can be used to access the personal imaging repository 320. In this latter case, the imaging extension 418 knows the location of the personal imaging repository 320 from information provided to the imaging destination with, for example, a redirection address (e.g., URL).

Next, the printing service accesses the imaging data (e.g., document) that are to be printed, as indicated in block 904. Where the imaging source 102 comprises a local application that executes on the client device 302, this access can be facilitated by entry by the user of the location of a document to be printed. Alternatively, where the imaging source 102 comprises a network-based service, access can be gained by automatic reference to the user's personal imaging repository 320 using an imaging extension 310 or 418. Assuming the user had just created and/or identified the document(s) using a network-based service, the imaging data comprises the default graphics and default composition that were stored by the network-based service.

At this point, the printing service retrieves the imaging data (i.e., document), as indicated in block 906. Once the imaging data have been retrieved, printing service can prompt the user to select the desired printing options, as indicated in block 908. Typically, this prompting is effected with an interface (e.g., graphical user interface (GUI)) in the form of one or more web pages that are presented to the user with the browser 304. After the various selections have been entered by the user, the user selections can be received, as indicated in block 910, and a print job is initiated, as indicated in block 912.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for printing on a local printing device using a network-based printing service associated with the local printing device, the method comprising:

obtaining a network address of the network-based printing service;

designating the network-based printing service address as a default destination such that a user browser executing on a client device is redirected directly to the network-based printing service when a print command is received;

receiving a print command provided to an imaging service with the user browser;

automatically redirecting the user browser to the network-based printing service;

accessing image data from a personal imaging repository with the network-based printing service; and initiating a print job on the local printing device with the network-based printing service.

2. The method of claim 1, wherein obtaining a network address comprises receiving a universal resource locator (URL) of the network-based printing service.

3. The method of claim 2, wherein the network-based printing service comprises a web site.

4. The method of claim 1, wherein designating the network-based printing service address as a default destination comprises updating a record of a current default destination with an imaging extension.

5. The method of claim 4, wherein the imaging extension comprises part of the user browser.

6. The method of claim 4, wherein the imaging extension executes on a remote network server.

7. The method of claim 1, wherein designating the network-based printing service address as a default destination comprises instructing a personal imaging repository that stores image data available for printing to designate the network-based printing service address as the default destination.

8. The method of claim 1, further comprising first detecting a direct connection between a client device and the local printing device.

9. The method of claim 8, further comprising removing the designation of the network-based printing service address as a default destination when a connection between the client device and the local printing device is severed.

10. The method of claim 1, wherein the network-based printing service is hosted by the local printing device.

11. The method of claim 1, wherein the network-based printing service is hosted by a remote network server.

12. The method of claim 1, wherein obtaining a network address of the network-based printing service comprises obtaining the network address from an imaging extension.

13. The method of claim 12, wherein the imaging extension comprises part of the user browser.

14. The method of claim 12, wherein the imaging extension executes on a remote network server.

15. The method of claim 12, wherein the imaging extension obtains the network address by querying the local printing device.

16. The method of claim 1, wherein obtaining a network address of the network-based printing service comprises obtaining the network address from a direct connection manager that executes on the client device.

17. The method of claim 16, wherein the direct connection manager obtains the network address by querying the local printing device.

18. The method of claim 1, wherein accessing image data from a personal imaging repository comprises accessing the image data using an imaging extension.

19. The method of claim 18, wherein the imaging extension comprises part of the user browser and accessing image data further comprises downloading generic access instructions from the network-based printing service to the imaging extension to call on the imaging extension to access the personal imaging repository.

20. The method of claim 19, wherein the imaging extension comprises at least one application programming interface (API).

21. The method of claim 18, wherein the imaging extension executes on a remote network server.

22. The method of claim 21, wherein the imaging extension comprises at least one application programming interface (API).

23. The system of claim 1, wherein the means for accessing image data from a personal imaging repository comprise an imaging extension.

24. The system of claim 23, wherein the imaging extension comprises part of the user browser and receives calls from generic access instructions downloaded into the user browser from the network-based printing service to the imaging extension to call on the imaging extension to access the personal imaging repository.

25. The system of claim 24, wherein the imaging extension comprises at least one application programming interface (API).

26. A system for printing on a local printing device using a network-based printing service associated with the local printing device, the system comprising:
   means for obtaining a network address of the network-based printing service; and
   means for designating the network-based printing service address as a default destination such that a user browser executing on a client device is redirected directly to the network-based printing service when a print command is received;
   means for automatically redirecting the user browser to the network-based printing service when a print command is received by an imaging service via the user browser;
   means for accessing image data from a personal imaging repository with the network-based printing service; and
   means for initiating a print job on the local printing device with the network-based printing service.

27. The system of claim 26, wherein the means for obtaining a network address comprise means for receiving a universal resource locator (URL) of the network-based printing service.

28. The system of claim 26, wherein the means for designating the network-based printing service address as a default destination comprise an imaging extension of the user browser.

29. The system of claim 26, wherein the means for designating the network-based printing service address as a default destination comprise a direct connection manager of the client device used to connect with the local printing device.

30. The system of claim 26, further comprising means for detecting direct connection between the client device and the local printing device.

31. The system of claim 26, wherein the means for obtaining a network address of the network-based printing service comprise an imaging extension.

32. The system of claim 31, wherein the imaging extension comprises part of the user browser.

33. The system of claim 32, wherein the imaging extension obtains the network address by querying the local printing device.

34. The system of claim 26, wherein the means for obtaining a network address of the network-based printing service comprise a direct connection manager that executes on the client device.

35. The system of claim 34, wherein the direct connection manager obtains the network address by querying the local printing device.

36. The system of claim 26, further comprising means for removing the designation of the network-based printing service address as a default destination when a connection between the client device and the local printing device is severed.

* * * * *